United States Patent Office 2,746,248
Patented May 22, 1956

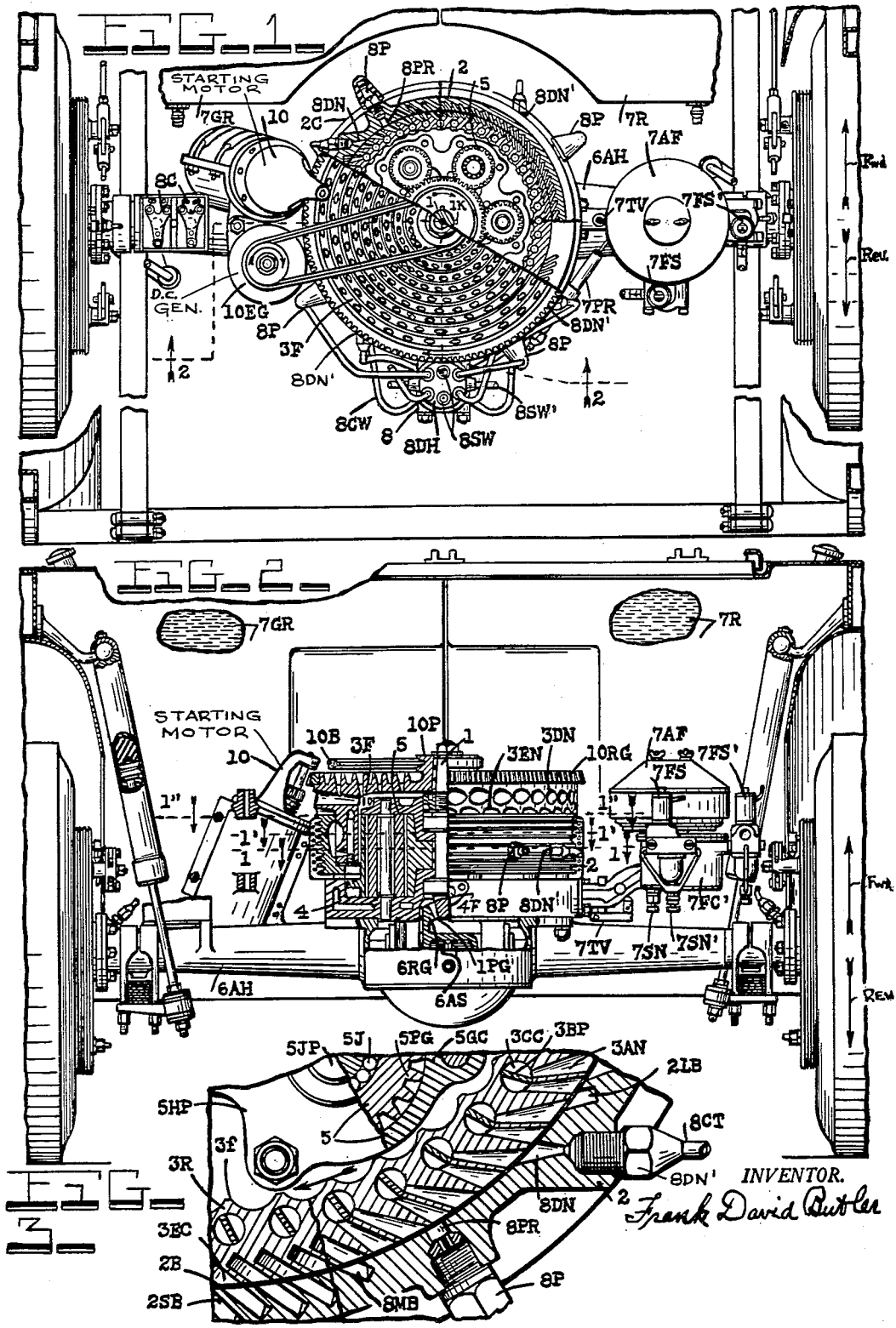

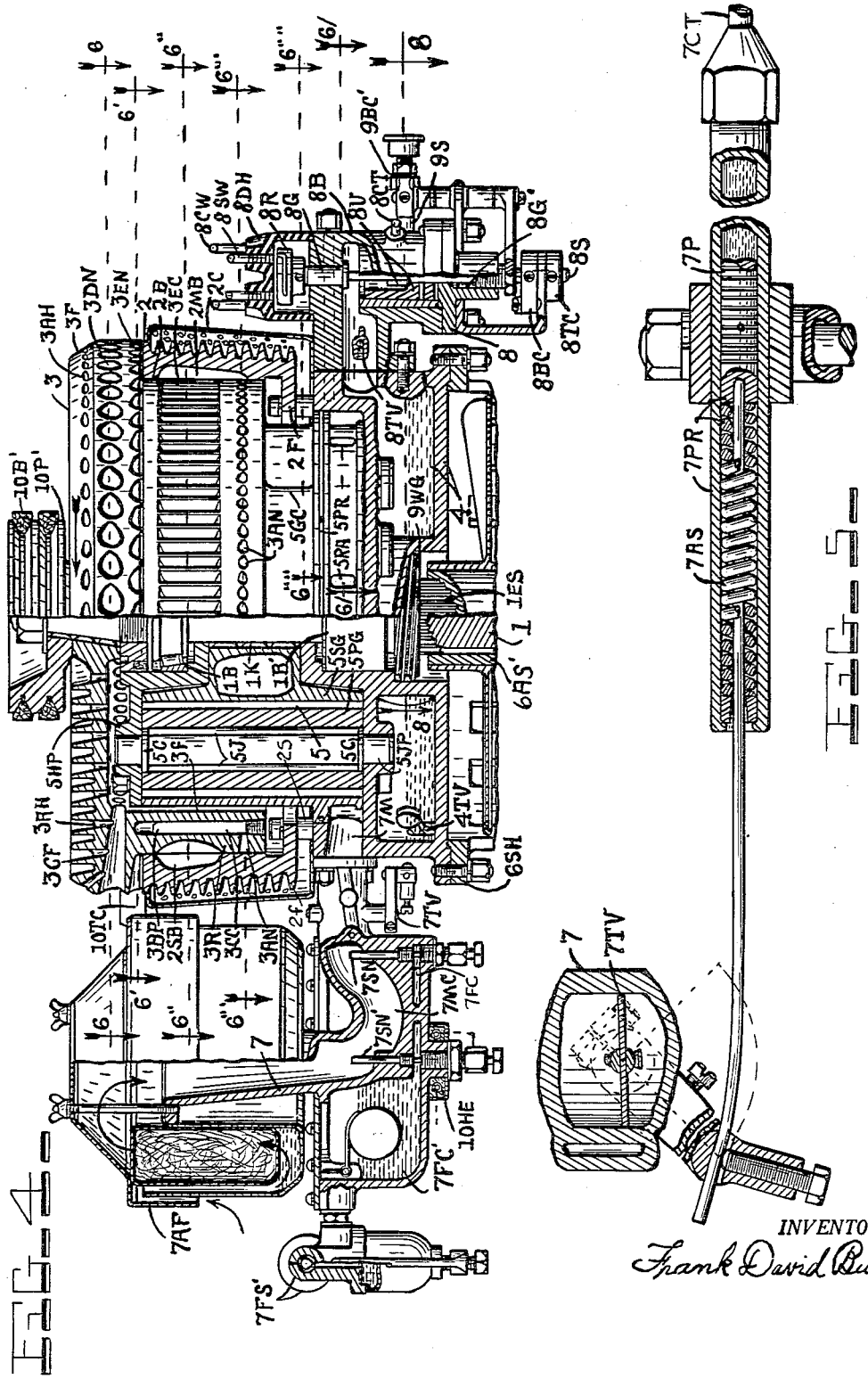

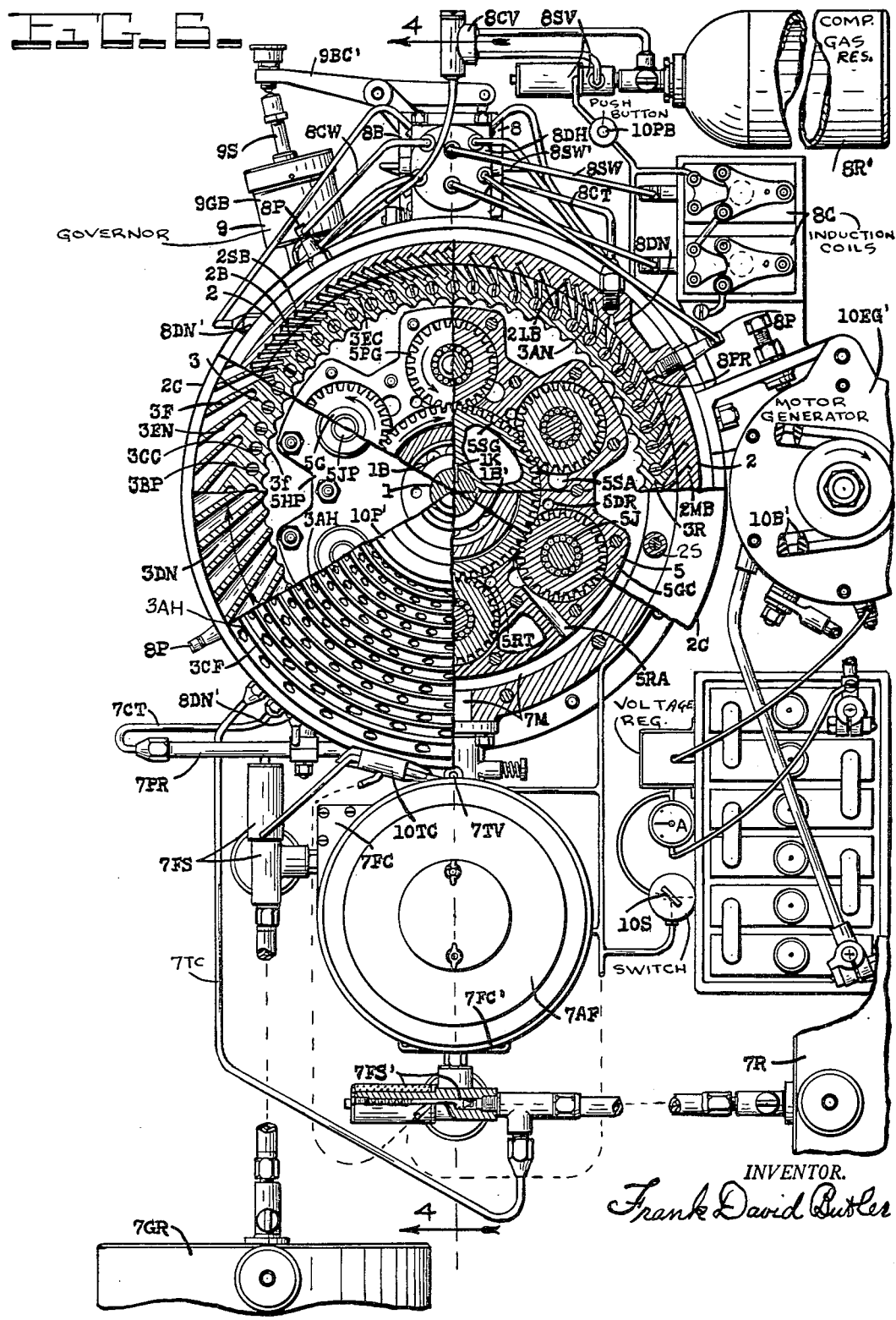

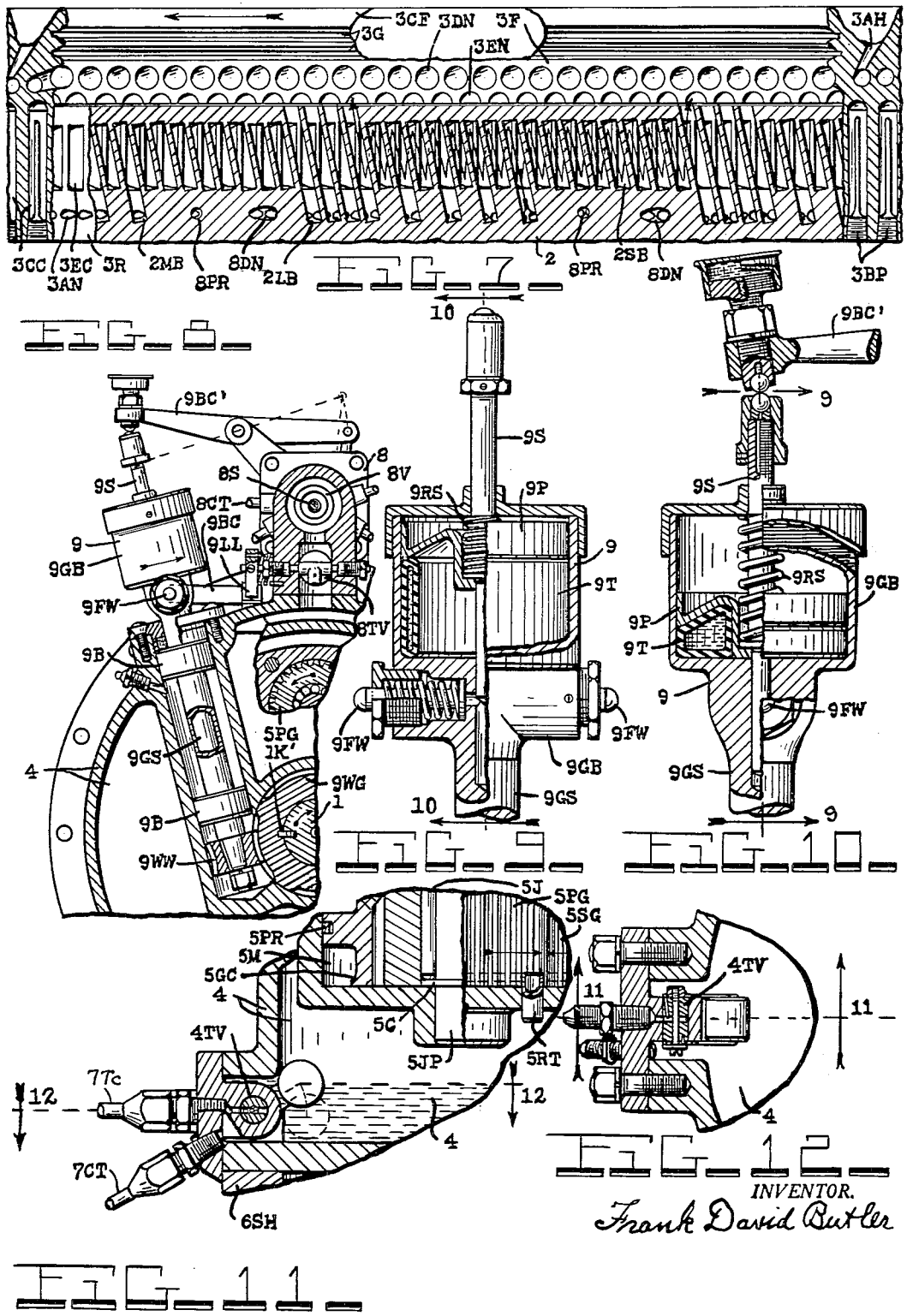

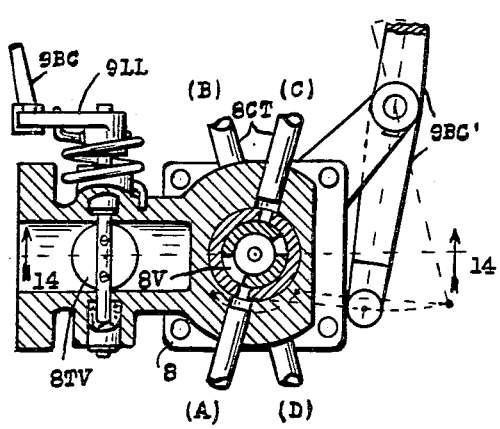
FIG. 13
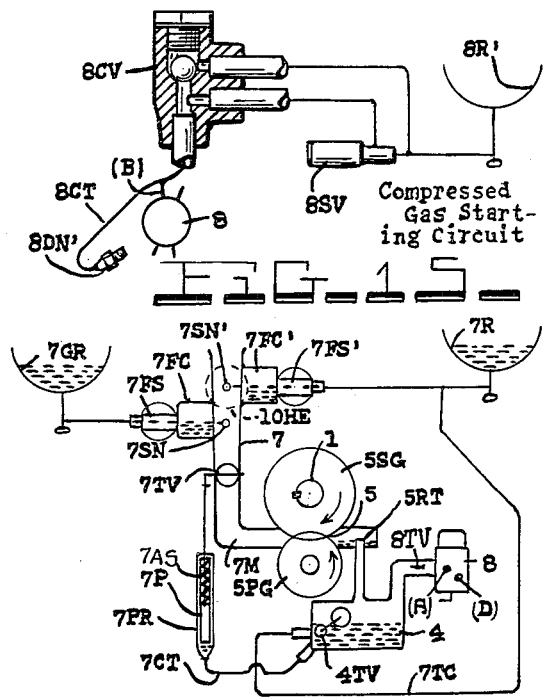
Compressed Gas Starting Circuit
FIG. 15
Gas and Fluid Circuits
FIG. 16
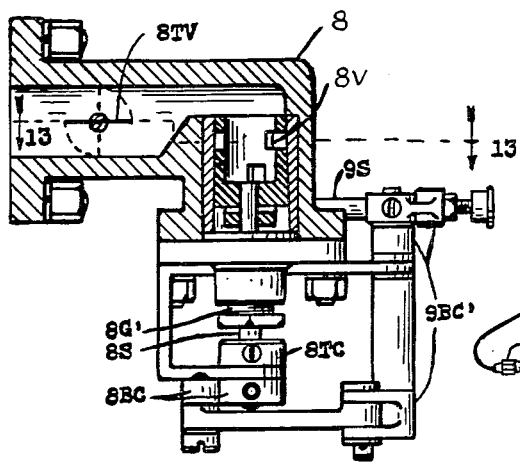
FIG. 14
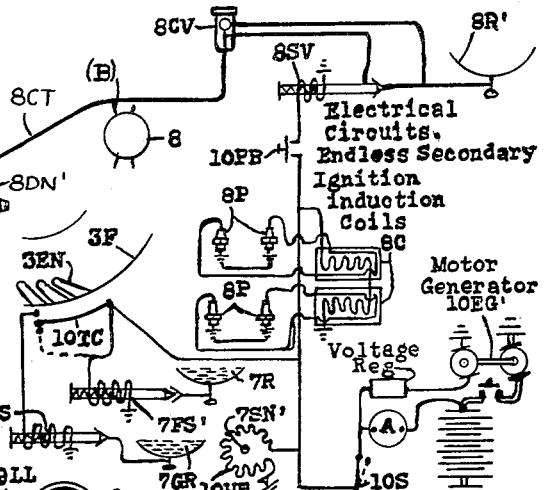
Electrical Circuits. Endless Secondary Ignition Induction Coils
Motor Generator 10EG'
Voltage Reg.
FIG. 19
INVENTOR.
*Frank David Butler*
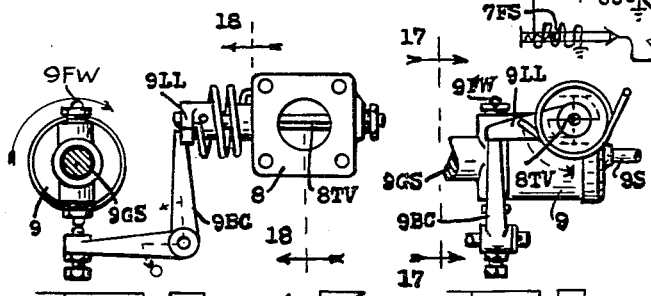
FIG. 17.   FIG. 18.

2,746,248

"T" SHAPED ROTOR TYPE OF, MULTIPLE GROUP EXPANSION, OPPOSITE DUAL FLOW PRESSURE VELOCITY COMPOUNDED; COMBUSTION GAS TURBINE MOTIVE POWER ASSEMBLY

Frank David Butler, Venice, Calif.

Application November 25, 1953, Serial No. 394,356

7 Claims. (Cl. 60—39.34)

My present invention relates in general to combustion gas turbines particularly of such types and in such form as unit power plant assemblies that may be started on common gasoline and then automatically shifted to operate on any type of combustible liquid fuel after a continuous train-type of ignition has been established within the turbine.

As subject type of turbine may be either manually and/or governor controlled and respectively for portable or stationary power plant use, an embodiment of each type of assembly is illustrated and described.

In this present turbine assembly, the following improvements are contemplated: the turbine rotor is constructed annular and flanged shape so that it may extend out beyond and may be maintained at a temperature below that of the annular shaped turbine stator, and may be formed into an air diffusing type of induced draft blower as combined with a diffuser type of exhaust blower and may be formed further to enclose a multiple geared type of oil drenched fuel mixture compressor; the turbine is provided with a fuel supply carburetor which is provided with dual fuel spray nozzles and dual float-valve chambers wherein one of such chambers is provided with a gasoline supply means and the other is provided with a crude-oil supply means, and wherein further each respective float-valve chamber is provided with an electrical solenoid actuated cut-out valve operable through a thermo-couple switch and connected so that the turbine may be started on gasoline and then shifted automatically to crude oil fuel after a train type of ignition has been established and the turbine heated to normal operating temperature; the carburetor throttle-valve is controlled entirely by a spring loaded compressed fuel mixture regulator; and, whereby a relatively constant pressure may be maintained upon a compressed fuel mixture accumulator. The speed of rotation and power output of the turbine rotor is controlled through a combined fuel mixture and ignition electricity distributor unit that may be either manually or governor actuated and which is connected in series respectively between said accumulator and a series of individual fuel mixture diffuser nozzles and between a pair of vibrating contact point type of electrical ignition induction coils and a series of individual ignition plugs, wherein one of the latter is arranged in series with each of said fuel mixture diffuser nozzles. A combined governor and overspeed tripping device is provided for automatically operating and controlling said combined distributor unit and is rotatably operable from the shaft of said turbine rotor and is provided respectively for oscillating a stem of said distributor and for tripping a quick closing butterfly valve which forms a part of such unit and is arranged in series with the compressed fuel mixture supply thereto from said accumulator. A unique fly-weight means is provided within and for operating such governor in the form of an annular shaped, liquid filled, sealed elastic tube which is hydrodynamically expanded and contracted and actuates the governor stem. A vast number, each of relatively small capacity, of combustion chambers are provided and each rotates with said turbine rotor and is provided with a partition baffle which separates the smaller ends of a pair of conical shaped combined diffuser nozzles and valve ports arranged in series with one another and extending tangentially convergingly, in the direction of rotor rotation, through the rim of said rotor and through which each such combustion chamber is first scavenged from end to end, then filled with a charge of compressed elastic fuel mixture which is then ignited therethrough and therein and subsequent to combustion is diffused and pressure velocity compounded as it is discharged therethrough from their respective combustion chamber. The products of combustion from each combustion chamber is provided to be pressure velocity compounded in two opposite directions simultaneously in respect to rotor rotation and after which such products are further expanded by being diffused within a row of series of tangentially extending exhaust diffuser nozzles arranged in the periphery of said flanged portion of said turbine rotor and forming a diffuser type of exhaust blower. Means applicable whenever a relatively small number of said fuel mixture diffuser nozzles are to be used and when the secondary windings of said ignition coils are endless, whereby no ignition distributor is required and wherein the vibrating spark at each ignition plug is then continuous. Other improvements include various methods by and through which the turbine rotor may be rotatively started and, means of constructing such turbine assembly relatively flat, in pancake form, and applying it as the motive power means located above and forming a part of the intermediate portion of the axle-shaft housing extending between a pair of oppositely located traction wheels of an automotive vehicle, or that may be used in such pancake form as applied above and forming the motive power means for rotatively driving the armature of a lighting and power electrical generator.

Additional unique minor improvements will be disclosed from time to time as the specification description progresses.

With reference to the drawings, Figs. 1 and 2 illustrate my combustion gas turbine invention embodied as a unit power plant motive power means for driving a pair of oppositely located traction wheels of an automotive vehicle, and wherein each of such traction wheels is preferably equipped with one of my previously invented combined hydrodynamical and compounded planetary gearing driven, internal fluid pressure variable and reversible transmission couplers, each capable of an extremely wide range of speed ratios and wherein each coupler is formed within the hub proper of its respective traction wheel assembly. Figs. 4 and 6 illustrate my turbine invention embodied as a unit power plant motive power assembly means for driving a lighting and power electrical generator, or that may be used as a portable power plant means usable for miscellaneous purposes.

With further reference to the drawings, Fig. 1 is a fragmentary plan of the turbine embodiment illustrated in Fig. 2, with the upper left 60° as the turbine would appear on the dotted and broken line 1—1, then reading clockwise, with the upper right 90° as on the dotted line 1'—1', with the lower right 30° as on the dotted line 1"—1", and with the remaining 180° in joint plan and broken away form of said Fig. 2; the latter figure is a rear elevation of the turbine embodiment illustrated in Fig. 1, and wherein the left one-half illustrates the turbine as it would appear on the dotted and broken line 2—2 of Fig. 1; Fig. 3 is an enlarged fragmentary detail of the elements of the turbine as illustrated at different levels in Fig. 1, and particularly discloses how continuous train-type of ignition may be attained after once starting such ignition by the usual ignition plug method; Fig. 4 is jointly a broken away side elevation and section of the turbine embodiment illustrated in Fig. 6, and as such turbine would appear on the dotted and broken line 4—4 of Fig. 6; Fig. 5 is an enlarged detail of the pressure regulator for automatically controlling the opening and closing of the carburetor butterfly type of throttle-valve; Fig. 6 is a fragmentary plan of the turbine embodiment Fig. 4, and wherein reading clockwise, the lower left 60° is in plan, the adjacent left 30° as on the dotted line 6—6, the upper left 30° as on the dotted line 6'—6', the upper left 60° as on the dotted line 6''—6'', the upper right 90° as on the dotted line 6'''—6''', the lower right 30° as on the dotted line 6''''—6'''', and the lower right 60° as on the dotted line 6/—6/ of said Fig. 4; Fig. 7 is a diagrammatical fragmentary sketch of the turbine stator and rotor as such would appear from slightly outward radially from the stator bore in projected form, and illustrates in detail the various means of co-operation between the elements of the turbine rotor and stator; Fig. 8 is a fragmentary sectional view of the combined governor and overspeed tripping device driving mechanism as it would appear on the dotted and broken line 8—8 of Fig. 4, and with a fragmentary portion, at a slightly higher level, of the combined electrical ignition and compressed fuel mixture distributing device which is operable by said governor and which is provided with a trip type butterfly valve as illustrated; Figs. 9 and 10 are enlarged detailed joint side elevation and sectional views of said combined governor and tripping device mentioned, and with the sectional portion of Fig. 9 as it would appear on the dotted and broken line 9—9 of Fig. 10, and the sectional portion of the latter as it would appear on the dotted line 10—10 of Fig. 9, both figures illustrating the unique, liquid filled and sealed, elastic hydrodynamically actuating member of said governor; Fig. 11 is a vertical section through the automatically operable pressure balanced trap type of dump valve for maintaining a constant level on the fluid in the combined sump and accumulator separator and is as such trap-valve would appear on the dotted line 11—11 of Fig. 12; the latter figure is a plan section of such trap-valve as it would appear on the dotted and broken line 12—12 of said Fig. 11; Fig. 13 is a sectional view through the compressed fuel mixture distributor and is as the latter would appear on the dotted line 13—13 of Fig. 14; the latter is a sectional view through said distributor as on the dotted line 14—14 of Fig. 13; Fig. 15 is a detail sectional view of a check valve provided with a by-pass line and used in connection with charging a compressed gas charging bank and for turbine starting purposes; Fig. 16 is a diagrammatical sketch of the fluid circuit of the turbine assembly; Figs. 17 and 18 are diagrammatical sketches of the mechanism for tripping the emergency overspeed tripping butterfly valve; and, Fig. 19 is a diagrammatical sketch of the electrical wiring systems of the turbine assembly.

With reference to the symbols of the drawings, similar symbols represent and indicate similar parts in the several figures: The numeral 1 indicates the elongated main shaft which is rotatively journalled upon the pair of tapering adjustable roller bearings 1B and 1B' (Fig. 4) concentrically within the elongated bore 2B of the elongated flanged annular shaped turbine stator 2, which latter should preferably extend in a vertical plane and, while it may be constructed integral, should be made detachable from other stator portions of the turbine. The turbine rotor 3 is secured to rotate coaxially in one direction with said main shaft 1 and consists of an elongated annular shaped portion 3R which is rotatable concentrically within said bore 2B and is integral with an upper flanged portion 3F which forms the hub of such rotor and projects out over the upper end of said stator 2. The elongated annular shaped cored combined liquid fuel sump and compressed fuel mixture accumulator 4 forms the lower one-half of the turbine stator 2 and should preferably be made detachable from the latter, though secured concentrically therewith. The elongated compressor drive sun-gear 5SG is secured to rotate coaxially with said main shaft 1 in tandem with said rotor 3 and concentrically within the elongated gearing casing 5GC, of the multiple geared planetary type of liquid fuel drenched elastic fuel mixture compressor 5 and meshes with the series of elongated, symmetrically spaced, driven planet-gears 5PG of such compressor as a means of compressing an elastic fuel mixture for such turbine. Said gearing casing 5GC, of said compressor 5, is detachable from said accumulator 4 and is provided with a detachable upper head-plate 5HP wherein the upper roller bearing 1B and the upper ends of the elongated journal pins 5JP, of the planet-gears 5PG, are supported. The lower roller bearing 1B' and the lower ends of said journal pins 5JP are supported in the upper end of said accumulator 4, and the latter may be flanged secured to the axle housing 6AH, as illustrated in Figs. 1 and 2, and/or may be secured to a tandem stator housing 6SH of an electrical light and power generator or similar device provided with a rotor that is to be driven by said main shaft 1 as illustrated in Figs. 4 and 6.

With reference to Figs. 4 and 5, as the unit power plant internal combustion turbine motive power assembly is to be started on gasoline and then automatically shifted to and operated on crude fuel oil as soon as the turbine is warmed up and continuous train-type of ignition has been established therein. An especially constructed carburetor 7 is provided and is equipped with dual float chambers 7FC and 7FC' (Figs. 4, 6 and 16) and respective adjustable dual spray-nozzles 7SN and 7SN' for accommodating gasoline and crude oil jointly therein. Each of said float chambers is provided with a fuel supply from their respective fuel reservoirs 7GR and 7R via their respective opposed spring type of electrical solenoid actuated automatic cut-out valves 7FS and 7FS' (Figs. 4, 6 and 16). The electrical circuits of these cut-out valves may be interlocked through a thermo-couple 10TC (Fig. 19) so that, while the ignition switch is on, such solenoids will automatically function and the valve 7FS will be opened and the valve 7FS' will be closed whenever the turbine is below a predetermined temperature, and will simultaneously function vice versa whenever the turbine temperature is normal during operation. Also, inasmuch as a predetermined constant pressure is to be carried on the compressed elastic fuel mixture within said accumulator 4, the throttle-valve 7TV of said carburetor 7 is automatically controlled by the pressure regulator 7PR which latter is connected respectively at one end thereof to said accumulator 4 and at the opposite end to said throttle-valve 7TV, with the spring 7AS therein opposing the movement of the plunger 7P which is actuated by the pressure in the accumulator 4 (Fig. 5). Access means is provided between the atmosphere and the out-meshing side of each of the multiple planet type of compressor gears 5PG of said compressor 5, so that during the operation of the latter an elastic fuel mixture suction will be taken via the air filter 7AF, carburetor venturi-tube mixing chamber 7MC, with its adjustable spray nozzles 7SN' and 7SN and throttle-valve 7TV, thence the inlet manifold 7M, surrounding the gearing casing 5GC and sealed by the packing ring 5PR in such casing, and, thence via the individual radially extending access bores 5RA which each connect said manifold 7M and the adjacent individual vertical extending access bore 5SA in said casing 5GC adjacent to each planet-gear 5PG. Simultaneously with the foregoing, the compressed elastic fuel mixture is discharged from the in-meshing side of each of said planet-gears 5PG via their individual vertical extending discharge recess 5DR, in said gearing casing 5GC, via the individual riser-tube 5RT (Fig. 11) directly into the adjacent combined fluid sump and compressed fuel mixture accumulator 4. Also, simultaneously with the foregoing functions, and with reference to Figs. 4, 6, 11, 12 and fluid circuit Fig. 16, said sun-gear 5SG and planet-gears 5PG of said compressor 5 are drenched with crude combustible oil which enters said gearing casing 5GC via the adjustable spray nozzle 7SN' of the carburetor 7, on the relatively low pressure suction side of said compressor, and maintains a constant supply of drenching fluid to said gears, and which drenching fluid overflows into said sump 4 through said riser-tubes 5RT which establish or limit the height of the fluid level in said compressor.

In connection with the above described method of drenching the compressor gearing, it is obvious that any pressure leakage existing between the discharge and supply pressure sides of such compressor past its gearing will tend to thoroughly atomize the drenching fluid sealing such gearing and will thus prepare the compressed elastic fuel mixture for efficient combustion later. Also, inasmuch as said combined fluid sump and compressed elastic fuel mixture accumulator 4 becomes a settling tank and separator, it is obvious that surplus fluid must be intermittently and preferably automatically dumped therefrom back into the crude oil reservoir 7R. Thus, with reference to Figs. 6, 11, 12 and 16, a detachable, pressure balanced, float-type of dump trap-valve 4TV is provided for maintaining a constant level on the combustible fluid within said sump 4 by intermittently automatically dumping such surplus fluid back into said oil reservoir 7R via the tubing connection 7TC.

As the combustion gas turbine is to be supplied with compressed elastic fuel mixture under a predetermined constant pressure from said accumulator 4, and must simultaneously be supplied with ignition electricity from the pair of vibrating contact point type of electrical induction coils 8C, Figs. 1, 6 and 19, a combined electrical ignition and compressed fuel mixture distributing unit 8 is provided and secured to the periphery of said accumulator 4, and consists of: an elongated stepped oscillatable stem 8S which extends concentrically within the main body 8B of such unit and is provided with the multiple ported tapering distributing valve 8V and electrically insulated distributing rotor 8R oscillatable coaxially therewith; access means extending from said accumulator 4 to within said valve 8V via the spring loaded, butterfly type of, trip-valve 8TV; electrical ignition supply wiring 8SW and 8SW' extending between said induction coils 8C and the distributor head 8DH of this unit; electrical ignition connection wiring means 8CW extending between said distributor head 8DH and the individual igniton plugs 8P; which latter are arranged in a row in the periphery of said turbine stator 2 in alternate series with the row of compressed fuel mixture diffuser nozzle plugs 8DN' in said stator and with which individual nozzle plugs one each of plugs 8P are paired; compressed fuel mixture connection tubing means 8CT extending between the distributor body 8B and such individual nozzle plugs 8DN' in said stator 2; gland means 8G and 8G' for packing said stem 8S; a slidable thrust collar means 8TC for adjusting valve 8V in the tapering bore of body 8B; a bell-crank lever 8BC by which said distributing valve 8V and distributing rotor 8R may be oscillated within said unit 8 either by a manually or governor controlled means; and, in case of the latter, to include a means (Figs. 17 and 18) for tripping said trip valve 8TV in the event the turbine rotor exceeds its maximum operating speed of rotation. With reference to the electrical wiring diagram Fig. 19, it is obvious that when two ignition induction coils are used with their primary windings connected in series and wherein each coil is provided with an endless secondary winding, that such two coils will simultaneously accommodate four ignition plugs. Thus in turbines provided with four or less ignition plugs, no ignition distributor would be required and the ignition spark at the four or less number of plugs 8P could be continuous. The fuel mixture distributor could then be constructed as illustrated in Figs. 13 and 14 and not combined with an ignition distributor.

With reference to Figs. 4, 6, 8, 9, 10, 13, 14, 17 and 18, the combined governor and overspeed tripping device 9 for respectively controlling the oscillations of said distributing valve 8V and distributing rotor 8R, and for tripping the butterfly type of trip-valve 8TV, of said distributing unit 8, in case of overspeed of the turbine rotor 3, consists of: an elongated stepped governor shaft 9GS which is journalled in said accumulator housing 4 upon the pair of roller bearings 9B and is rotated at right angles to said main shaft 1 by the worm-gear 9WG rotatable coaxially with the latter and meshing with the worm-wheel 9WW which latter is rotatable coaxially with said shaft 9GS, and wherein the enlarged stepped portion 9GB forms the governor body; a pair of elongated, flanged, adjustable fly-weights 9FW which are spring loaded and slide radially oppositely outward whenever the turbine rotor 3 exceeds its maximum predetermined operating revolutions, and thus contact the adjacent adjustable end of the bell-crank lever 9BC and trips the latch-lever 9LL of said trip-valve 8TV and thereby closes off the compressed fuel mixture supply to the turbine from the accumulator 4 via the distributing unit 8; an annular shaped, liquid filled and sealed, hydrodynamically expanded and contracted elastic tube 9T for axially reciprocating the piston 9P and the elongated flanged governor stem 9S during the rotation of governor 9 and in opposition to the resilient spring 9RS, and thereby oscillatably actuating said bell-crank lever 8BC, of said distributing device 8, via the adjustable governor bell-crank lever 9BC'; and wherein and whereby said governor 9 thus controls the oscillations of said distributing valve 8V and distributing rotor 8R, of said distributing unit 8, in accordance with the speed of rotation of said main shaft 1.

With reference to Figs. 1, 2, 3, 4, 6 and 7, the T shaped turbine rotor is constructed as follows: the annular shaped portion 3R is provided with a row of series of elongated vertically extending combustion chambers 3CC which are each provided with a sunken-headed type of elongated rectangular shaped baffle partition 3BP which substantially forms an inverted U shaped compartment of each such combustion chamber; a row of series of pairs of conically shaped combined diffuser access nozzles 3AN which terminate convergingly in pairs in their respective combustion chambers 3CC with one located on either side of said partition 3BP, and which pairs of access nozzles originate in series with one another in the periphery of said rotor 3 and extend tangentially into the latter in the direction of its rotation; a row of series of curved expansion chamber buckets 3EC extending tangentially into the periphery of said rotor in the direction of rotation, and provided to be located outward radially from said combustion chambers 3CC and adjacent above the row of said access nozzles 3AN; a row of series of vertically extending semi-circular shaped cooling fins 3f formed along the inner surface of said annular shaped portion 3R; a row of series of semi-circular shaped exhaust diffuser nozzles 3EN each extending semi-radially and tangentially in the under side of said flanged portion 3F and originating adjacent to said stator bore 2B and terminating in the periphery of said rotor flanged portion 3F; a row of series of conically shaped circulating air diffuser nozzles 3DN each extending semi-radially and tangentially from internally to externally within such flanged portion 3F and provided as an induced air circulating blower means and for extracting the heat of combustion from said rotor; a series of rows of vertically extending cooling fins 3CF integral with the upper side of said flanged portion 3F and connected with a series of rows of access holes 3AH, which latter extend obliquely (Fig. 7) from the lower to the upper sides of such flanged portion 3F, intermediate to the rows of said fins 3CF and assist in circulating air and in extracting the heat from said rotor 3; and, such rotor 3 and/or its shaft 1 should be provided with a V pulley 10P for driving an electrical generator 10EG through a V belt 10B as illustrated in Figs. 1 and 2, and/or for either driving or being driven by a combined electrical generator and starting motor 10EG' by a belt 10B' as illustrated in Fig. 6. Such T shaped rotor 3 should further be provided with means for rotative starting purposes such as the ring-gear 10RG for the starting motor 10 (Figs. 1 and 2), the plurality of V grooves 3g (Fig. 7) for manual starting with a rope, and/or such rotor may be started by compressed gas previously accumulated within the reservoir 8R' through the combined non-return-check and charging by-pass valve 8CV (Figs. 6 and 15) in series with the electrical solenoid operated valve 8SV which latter is controlled by the electrical push-button 10PB (Figs. 4 and 19). With this last mentioned starting arrangement, such check valve 8CV and solenoid operated valve 8SV are connected in series with the tubing connection line extending between said reservoir 8R' and preferably other than the first connection tubing line 8CT that is to be placed into service. Then, with the distributing valve 8V closed, compressed gas may be supplied from said reservoir 8R' direct through such line 8CT to its respective diffuser nozzle plug 8DN' as said valve 8SV is opened electrically by depressing said push-button 10PB, and the turbine rotor started by such method.

The elongated flanged annular shaped turbine stator 2 consists of: the elongated concentric bore 2B initiating adjacent the upper end of said stator 2 and terminating adjacent the flanged portion 2F at the lower end thereof; a row of series of elongated curved stator buckets of at least three different lengths (Fig. 7) all extending obliquely tangentially from said bore 2B into said stator 2 in opposite to the direction of rotor rotation therein, and wherein the shorter buckets 2SB, intermediate length buckets 2MB and long length buckets 2LB all co-operate, during the rotation of said rotor 3, with the row of rotor expansion chamber buckets 3EC, while said buckets 2MB and 2LB each cooperate at one end thereof intermittently with said access nozzles 3AN, and wherein each of said buckets 2LB is open at its opposite end to the atmosphere via said exhaust diffuser nozzles 3EN, and wherein further the expansion flow of the products of combustion is divided at the outlet ends of said buckets 2MB, as diagrammatically illustrated in Fig. 7, and then flows both with and opposite to rotor rotation; and, with reference to Figs. 1, 2, 3 and 6, the compressed fuel mixture diffuser nozzle plugs 8DN' and their paired ignition plugs 8P (detail Fig. 3) are arranged alternately in series in a row in said stator 2 and the diffuser nozzles 8DN of the former terminate tangentially in said bore 2B with their larger diameter ends projecting in the direction of rotor rotation, while said paired ignition plugs 8P are each threaded radially into the periphery of said stator 2 and terminate in said bore 2B in an access recess 8PR which latter forms the compartment within which continuous train type of ignition is established by the persistence therein of the flame of combustion, and wherein said nozzles 8DN and their paired ignition plug access recesses 8PR are in series with said stator buckets 2MB and 2LB of each expansion group and similarly thereto, intermittently co-operate with said access nozzles 3AN during the rotation of said turbine rotor 3.

With reference to Figs. 1, 3, 6 and 7, a detailed description of the cycle of operation of one of the expansion groups of the turbine, during the rotation of the turbine rotor 3 past such group, is as follows: each combustion chamber 3CC is first consecutively scavenged from end to end with fresh compressed fuel mixture as the leading edge of the leading access nozzle 3AN co-operates with the adjacent diffuser nozzle 8DN, and the trailing paired access nozzle 3AN is simultaneously in co-operation with the adjacent stator bucket 2LB; each combustion chamber 3CC is then consecutively filled with a charge of said fuel mixture through co-operation of the nozzles 8DN and 3AN adjacent one another; and then, as the last mentioned cooperation ends, the charge of fuel mixture is sealed within the combustion chamber and absorbs heat from the surrounding metal. Then, as the leading edge of the leading access nozzle 3AN starts cooperating with the adjacent ignition plug recess 8PR, such fuel mixture charge is ignited either by a spark at the ignition plug 8P and/or by the persistent flame of previous combustion which is present within said recess 8PR and forms continuous train type of ignition; then combustion of such charge within the paired access nozzles 3AN and the combustion chamber 3CC takes place, and, as the trailing edge of the trailing access nozzle 3AN terminates cooperation with said recess 8PR, the products of combustion within said nozzles 3AN and said combustion chamber 3CC are sealed therein and the temperature of such products rises rapidly to the maximum limit corresponding to the charge pressure prior to ignition. Then, as the leading access nozzle 3AN initiates cooperation with the adjacent edge of the adjacent, curved and gradually increasing in capacity, stator bucket 2MB, the pressure velocity compounding of such products of combustion starts, and the rotor 3 is given a reaction thrust as such products expand into said stator bucket, and the volume and velocity of such products are increased as such products pass through the latter. Then, with reference to Fig. 7, as such products enter the two adjacent expansion chamber buckets 3EC, from the opposite end of said bucket 2MB, such products provide said rotor 3 with a dual impulse as such products flow both in the direction of rotor rotation and oppositely thereto, and such flow is followed by dual reaction et cetera as such velocity compounding continues during the cooperation of the curved buckets 3EC, in the rotor 3, and the oppositely extending tangent buckets 2SB, 2MB and 2LB in the bore 2B of the stator 2. During such flow, the volume and velocity of such products is increased in each stator bucket, and the velocity of such products is absorbed by the rotating rotor 3 each time such products enter, in dual form, said buckets 3EC extending tangentially into the periphery of said rotor 3. The admittance of such products of combustion from each of said combustion chambers 3CC via their respective paired access nozzles 3AN into the adjacent ends of the stator buckets 2MB and 2LB is accomplished intermittently as is apparent from the diagrammatical arrangement Fig. 7. After the kinetic values of such products of combustion have been absorbed by said rotation of said rotor 3, such products are ultimately exhausted to the surrounding atmosphere via the upper open ends of the stator buckets 2LB and the row of tangentially extending exhaust diffuser nozzles 3EN, which latter terminate in the periphery of the flanged portion 3F of said turbine rotor 3, and, one cycle of operations of one group of expansion units of such combustion gas turbine is completed.

In a combustion gas turbine of this type it is extremely important that the radial clearance between the rotor 3 periphery and the bore 2B be kept at a predetermined minimum, and that preferably the rotor 3 be kept slightly cooler than the turbine stator 2. One of the objects of this invention is to induce rather than to force the circulating air through the turbine with the circulating blower formed by the semi-radial and tangentially extending diffuser nozzles 3DN and to thus reduce the air pressure and temperature and to thereby extract the heat from the surrounding objects. Thus, in this invention, the induced air circulating blower 3DN induces air internally to the turbine, from the atmosphere surrounding the stator 2, via the perforated enclosure casing 2C surrounding the series of rows of tapering annular shaped cooling fins 2f extending radially in the external portion of said stator 2. Thence, such air is induced inward radially past the series of combined spacer and alinement spools 2S which extend between the stator flange 2F and the top of the accumulator 4. Thence, such air is induced upward through the annular space extending between the rotor cooling fins 3f and the external surface of the compressor gearing casing 5GC into the suction side of said blower 3DN. Thence, such air is discharged upward and outward through the plurality of rows of series of conically shaped access holes 3AH (Fig. 7), which form relatively small air diffuser and heat extracting nozzles, and thence past the adjacent rows of cooling fins 3CF on into the atmosphere. Simultaneously therewith the last function, the greater portion of such induced air is forced outward semi-radially and tangentially through said blower diffuser nozzles 3DN and extracts heat from the rotor flange 3F as it is discharged from the rim of the latter tangentially in opposite to the direction of rotor rotation into the surrounding atmosphere.

In combustion gas turbines using a tandem fuel mixture compressor provided with multiple planetary type of combustible oil drenched compressor gearing, it is extremely important that the root clearances of such gearing be maintained within the limits of its minimum predetermined tolerances, that such gearing be kept sealed wtih sufficient vaporizable combustible oil, that the sun-gear 5SG be slidable axially over a spline or the series of half-moon keys 1K in shaft 1, and that the collar 5C adjacent each end of the needle journal 5J of each planet-gear 5PG be pressed into and flush with the end of its respective planet-gear, but a rotatable fit over the journal pin 5JP.

With reference to Figs. 4, 6 and 16, inasmuch as crude oil will not vaporize or atomize in the carburetor spray nozzle 7SN' until the viscosity of such oil is reduced by heating, it is obvious that the supply of such crude oil to the carburetor 7 via the solenoid valve 7FS' would normally not have to be cut off while starting the turbine on gasoline, and that the electrical actuating circuit of such valve 7FS' may either extend direct or in series with the thermo-coupler to the source of electrical supply. It is essential that the viscosity of said crude oil be reduced at a location immediately surrounding the base of the spray nozzle 7FS' by a form of electrical heating element 10HE, which latter should preferably be in the form of a self variable and regulatable thermo-actuated potentiometer, similar to the heating element of a modern coffee maker, and should maintain such crude oil under a constant predetermined viscosity.

With reference to Fig. 3, it is obvious that substantially any type of properly mixed and atomized combustible oil and air fuel mixture under pressure will be ignited and will form combustion within the numerous combustion chambers 3CC of this particular type of combustion gas turbine, once the flame type of continuous train ignition has formed and persists in each ignition plug recess 8PR. It is further apparent that in order to insure ignition of the fuel mixture in each expansion group of the turbine, that ignition electricity must either be continuous and/or must be distributed to each ignition plug 8P, paired with each diffuser nozzle 8DN, each time one of such nozzles 8DN is either placed into and/or out of service during the oscillation of the stem 8S of the distributing unit 8 either manually or by the governor 9.

In the construction of the turbine assembly, the main shaft 1, of the embodiment Figs. 1 and 2, may be constructed integral with the bevel pinion gear 1PG and may thus drive the relatively large diameter bevel ring-gear 6RG, which latter is internally splined and drives the two oppositely located preferably full-floating type of axle shafts 6AS which are rotatively supported in the axle housing 6AH. The main shaft 1, of the embodiment Figs. 4 and 6, may be constructed integral with the elongated spline 1ES for driving a lighting and power electrical generator armature shaft 6AS' or similar shaft of any driven mechanism, and also may be provided with means for driving the governor shaft 9GS as illustrated.

Inasmuch as in the illustrated embodiments of the turbine, combustion occurs four times in each combustion chamber 3CC during each revolution of the main shaft 1, and as the fuel mixture supplied to each such combustion chamber is under from approximately 6 to 8 atmospheres and as a portion of this pressure is expended in vaporizing such fuel mixture as it is being compressed within the compressor 5, it is obvious that the capacity of such compressor should normally be more than required to accommodate the turbine under less restrictive conditions.

It should be particularly noted that the compressed fuel mixture delivered via the distributor 8 to the individual fuel mixture diffuser nozzles 8DN from the accumulator 4 is under a constant pressure controlled by the pressure regulator 7PR regardless of the number of such nozzles placed in or out of service, while the opening and closure of the carburetor throttle valve 7TV is controlled entirely by such regulator 7PR.

It is anticipated that slight changes may be necessary in practice within the scope of the claims without digressing from my inventive concept.

Thus having fully described my invention in two embodiments of its use, I claim:

1. In a combustion gas turbine unit power plant assembly equipped with: a stator having an elongated bore, an elongated shaft mounted turbine rotor rotatable in one direction within said bore, a row of series of cylindrical combustion chambers extending parallel with said bore in a rim portion of said rotor and each provided with a baffle partition, a row of series of pairs of diffuser access nozzles with each pair extending tangentially convergingly through said rim of said rotor and terminating with one nozzle on either side of the baffle in its respective combustion chamber, a row of series of curved rotor expansion chamber buckets wherein each bucket extends tangentially into said rim of said rotor, a row of series of at least three different lengths of curved stator expansion chamber buckets wherein each extends tangentially from said bore into said stator and the longer of which buckets are open to one end of said stator, a row of series of fuel mixture diffuser nozzles each extending through said stator and terminating tangentially divergingly within said bore in series with a group of certain of said different lengths of stator buckets and co-operative with each of said diffuser access nozzles, a row of series of ignition plugs in alternate series with said row of fuel mixture diffuser nozzles and wherein each plug extends through said stator and terminates in a recess open to said bore and is in series with one group of said stator buckets, a combined fuel mixture and ignition electricity distributor provided with an oscillatable valve and rotor and through which to respectively supply compressed fuel mixture individually to each of said fuel mixture diffuser nozzles and ignition electricity to each of said ignition plugs by pairs and in a predetermined sequence, a multiple geared planetary type of oil drenched elastic fuel mixture compressor for said turbine and having an elongated drive sun-gear rotatable by said elongated shaft, a combined compressed fuel mixture accumulator and liquid settling compartment in communication with a discharge side of said compressor and a supply side of said distributor and having a float-valve through which to automatically return surplus fluid to an oil reservoir, a carburetor in communication with a suction side of said compressor and having a butterfly type of throttle-valve, a pressure regulator in communication with said accumulator and connected to said butterfly valve of said carburetor and for automatically controlling such butterfly valve, and, means for air cooling said stator and said turbine rotor, the provision therewith of: a T-shaped enlarged flanged portion integral with and projecting radially from said rotor and rotatable therewith closely adjacent to the open ends of the longest stator buckets in one end of said stator; a row of series of semi-conically shaped exhaust diffuser nozzles each initiating adjacent to the open ends of said longest stator buckets and terminating tangentially divergingly in the periphery of said flanged portion of said rotor in opposite to the direction of rotation of the latter; an induced draft cooling air circulating means provided with a row of series of air diffuser nozzles each extending, closely adjacent to said exhaust diffuser nozzles, tangentially divergingly through said flanged portion and terminating in the periphery thereof in opposite to the direction of rotor rotation and wherein the induced draft means is provided to induce air from external to internally to said rotor; a series of rows of series of conically shaped air diffuser holes wherein each row of such holes originate in said row of air diffuser nozzles and extend obliquely, in opposite to rotor rotation, divergingly to external to such flanged portion and terminate between two adjacent annular shaped cooling fins integral with the latter; a hub means forming a part of said flanged portion and for securing such turbine rotor to said elongated shaft; a turbine rotor starting means a part of which is rotatable coaxially with said flanged portion and said elongated shaft; a row of series of elongated cooling fins formed integral internally to said rim portion of said rotor and terminating adjacent to the induction side of said induced draft means; a gasoline float-valve chamber and fuel mixture spray nozzle, and a crude-oil float-valve chamber and fuel spray nozzle provided in dual parallel extending form within said carburetor and in series with said throttle-valve thereof such carburetor; means for supplying gasoline from a reservoir to such gasoline float-valve chamber through an electrical solenoid operated cut-out valve; a thermocouple switch for automatically controlling said solenoid; means for supplying crude-oil from said oil reservoir to said crude-oil float-valve chamber through a similar solenoid cut-out value; means for electrically heating such crude-oil for reducing its viscosity and at a location in the vicinity of such crude-oil spray nozzle; a butterfly type of quick-closing trip-valve forming a part of said distributor and in series with the compressed fuel mixture supply thereto from said accumulator; a combined governor and overspeed tripping member rotatable from said elongated shaft and provided respectively for automatically regulating said oscillatable valve and rotor of said combined distributor, and for tripping said quick-closing trip-valve of the latter whenever said shaft overspeeds; a series of riser tubes located within a gearing casing of said compressor and provided for limiting the oil level height in such compressor and forming access communication between the latter and said accumulator; means for enclosing said compressor within said stator and said rim portion of said rotor for compactness; and, means of applying such turbine assembly for power delivery purposes.

2. The combustion gas turbine of claim 1 wherein said row of series of exhaust diffuser nozzles rotates with said flanged portion of said turbine rotor closely adjacent to said open ends of said longest stator buckets in one end of said stator and thus provide the ultimate means through which to exhaust the expanding products of combustion of the compressed fuel mixture which was initially supplied to and ignited within each of said combustion chambers, through their respective pair of diffuser access nozzles, and then pressure velocity compounded within the latter, said row of series of different length of stator expansion chamber buckets and the adjacent row of series of said rotor expansion chamber buckets, and prior to the exhaust of such products through the longest of said stator expansion chamber buckets into such row of exhaust diffuser nozzles and during its final exhaust through the latter to the atmosphere in a direction opposite to that of rotor rotation.

3. The combustion gas turbine of claim 1 characterized by the locating of said row of exhaust diffuser nozzles, row of series of air diffuser nozzles, and series of rows of series of air diffuser holes all in the enlarged flanged portion of said T-shaped turbine rotor, thereby results in providing means, due to expansion which takes place in these diffuses, of extracting heat from such turbine rotor and thereby provides a means of keeping said turbine rotor relatively cooler than said stator and thereby allowing for a minimum rotative clearance to be used between the periphery of said rotor and said elongated bore of said stator.

4. The combustion gas turbine of claim 1 characterized by such T-shaped turbine rotor provided with such enlarged flanged portion projecting radially and rotatable closely adjacent to one end of said stator, comprising the following as forming a part of such enlarged flanged portion: said row of series of exhaust diffuser nozzles which substantially form an induced draft exhaust blower which discharges oppositely to rotor rotation; said row of series of air diffuser nozzles which form said induced draft cooling air circulation means which induces air from externally to said stator to internally to said turbine rotor and discharge such air from the periphery of the rotor in opposite to rotor rotation; said series of rows of series of air diffuser holes which form a part of said induced draft means and which induce air from said air diffuser nozzles and discharge it obliquely, oppositely to rotor rotation, between adjacent series of elongated tapering cooling fins which latter extend at right angles to such flanged portion; and, said hub through which said turbine rotor is secured to coaxially rotate with said elongated shaft concentrically in one direction of rotation within said elongated bore of said stator.

5. The combustion gas turbine of claim 1 characterized by, said combined governor and overspeed tripping member rotatable from said elongated shaft and provided respectively for automatically regulating said oscillatable valve and rotor of said combined distributor, and for tripping said quick-closing trip-valve of the latter whenever said shaft overspeeds, comprising: an enlarged elongated cylinder forming the governor main body portion and integral with an elongated reduced drive-shaft which is rotatable at right angles to and by said elongated shaft of the turbine rotor; an elongated piston and governor stem slidably mounted concentrically within a bore of such main body of said governor and wherein such governor stem projects out beyond such governor bore; an elongated annular shaped, liquid filled, sealed elastic tube provided to be expanded and contracted within such governor bore hydrodynamically, during the rotation of such cylindrical governor, and to reciprocatably actuate said piston and governor stem within said governor bore; a resilient spring opposing the actuation of said piston and stem by said elastic tube; an adjustable oscillatable bell-crank means through which to oscillate said valve and rotor of said combined distributor from and by such reciprocatable governor stem; a pair of adjustable spring loaded radially slidable fly-weights mounted oppositely to one another in the opposite end of said cylinder to the stem of such governor and rotatable with such governor; and, an adjustable oscillatable bell-crank means contactable, at one end thereof, by either of such fly-weights during the overspeeding of such governor or the turbine shaft, and provided, at such times and at its opposite end, to trip a latch lever of said quick-closing trip-valve, which latter is spring loaded, and when tripped closes off the supply of compressed fuel mixture to said distributor.

6. In a combustion gas turbine unit power plant assembly comprising; an elongated annular shaped stator having a concentric bore, an elongated shaft mounted turbine rotor rotatable concentrically in one direction within said bore, a row of series of combustion chambers each extending parallel to and located in a rim portion of said rotor and each equipped with a baffle partition, a row of pairs of series of access nozzles with each pair extending tangentially convergingly from said bore through said rim portion of said rotor into its respective combustion chamber and separated therein by its baffle partition, a row of series of fuel mixture diffuser nozzles each extending through said stator tangentially divergingly into said bore, a similar alternate row of series of ignition plugs each extending through said stator into said bore and terminating within a recess in the latter, a row of series of rotor expansion chamber buckets each extending tangentially from said bore into said rim portion of said rotor, a row of series of at least three different lengths of stator expansion chamber buckets arranged in a series of groups with one fuel mixture diffuser nozzle and one ignition plug in series with each group and wherein each bucket of each group extends from said bore obliquely tangentially into said stator oppositely to rotor rotation and wherein further the longest of said stator buckets are open to one end of said stator, a fuel mixture compressor for such turbine and having a driving member rotatable coaxially with said shaft in tandem with said rotor, a combined fuel mixture and ignition electricity distributor equipped with an oscillatable distributing valve and rotor and provided with a quick-closing trip-valve, distribution tubing connection means extending between said distributor and each of said fuel mixture diffuser nozzles, distribution connection wiring extending between said distributor and each of said ignition plugs, means of ignition supply electricity from a battery through a pair of vibrating contact point type of electrical induction coils to said distributor, a combined fluid sump and compressed fuel mixture accumulator in communication with a discharge side of said compressor through a series of accesses provided in the latter and also in communication with said distributor through said trip-valve of the latter, a carburetor in communication with a fuel mixture suction side of said compressor and equipped with a butterfly type of throttle-valve, a spring loaded pressure regulator operable by pressure from said accumulator and provided to control the opening and closing of said throttle-valve of said carburetor, a float type of trap-dump-valve for automatically returning excess liquid fuel and compressor drenching oil from said sump to a fuel oil supply reservoir, and, means for air cooling said stator and its rotor, the combination provision therein and therewith of: T shaped enlarged flanged portion integral with and projecting radially from said rotor and rotatable therewith closely adjacent to the ends of said longest stator buckets open to one end of said stator; a row of series of semi-conically shaped exhaust diffuser nozzles each initiating adjacent to such open ends of said stator buckets and terminating tangentially divergingly in the periphery of said flanged portion in opposite to the direction of rotor rotation; a row of series of air diffuser nozzles forming an induced draft cooling air circulating means for inducing cooling air from within said rotor and located closely adjacent to said exhaust diffuser nozzles and wherein each such air diffuser nozzle extends tangentially divergingly through said flanged portion and terminates in the periphery thereof in opposite to the direction of rotor rotation; a series of rows of series of conically shaped air diffuser holes wherein each row of such holes originate in said row of air diffuser nozzles and extend obliquely, in opposite to rotor rotation, divergingly to external to such flanged portion and terminate between two adjacent annular shaped endless cooling fins integral with and extending at right angles to said flanged portion; a hub means forming a part of said flanged portion and for securing such turbine rotor to said elongated shaft; a turbine rotor starting means forming a part of said flanged portion; a row of series of elongated cooling fins formed integral internally to said rim portion of said rotor and terminating adjacent to the induction side of the induced draft means; a gasoline float-valve chamber and gasoline fuel mixture spray-nozzle, and a crude-oil float-valve chamber and crude-oil spray nozzle provided in dual form within said carburetor and in series with said throttle-valve thereof the latter; means of supplying gasoline from a reservoir to such gasoline float-valve chamber through an electrical solenoid operated cut-out valve; means for supplying crude-oil from said fuel oil supply reservoir to said crude-oil float-valve chamber through a similar solenoid operated cut-out valve; means for electrically heating such crude-oil in the vicinity of said crude-oil spray-nozzle and for reducing the viscosity of such oil for atomizing purposes; a thermo-couple switch located adjacent to the larger ends of said exhaust diffuser nozzles and provided for automatically cutting out such solenoid operated gasoline cut-out valve whenever the turbine is operating under normal exhaust temperature and continuous train type of ignition conditions; a combined governor and overspeed tripping member rotatable from said elongated shaft and provided respectively for automatically regulating said oscillatable distributing valve and rotor of said combined distributor, and for tripping said said quick-closing trip-valve of the latter whenever said shaft over-speeds; a series of riser tubes forming said accesses between said compressor and said accumulator and wherein such riser tubes are provided for limiting the height of the drenching oil adjacent to the multiple gears of and in said compressor; means for enclosing such compressor within said stator and said rim portion of said rotor for compactness; cooling air access means extending from external to said stator to the supply side of said induced draft means; and, means for applying such turbine assembly for power delivery purposes.

7. The combustion gas turbine of claim 1 characterized in that said means, a part of which is rotative coaxially with said flanged portion and said shaft, for rotatively starting such turbine rotor, consist of: a dual V pulley rotative with said flanged portion of said rotor and driven through dual V belts by a combined electrical generator and starting motor.

References Cited in the file of this patent
UNITED STATES PATENTS

| | | |
|---|---|---|
| 1,103,024 | Bentley | July 14, 1914 |
| 1,319,752 | Brown | Oct. 28, 1919 |
| 2,667,744 | Butler | Feb. 2, 1954 |
| 2,680,949 | Butler | June 15, 1954 |